US006548099B1

(12) United States Patent
Baker et al.

(10) Patent No.: US 6,548,099 B1
(45) Date of Patent: Apr. 15, 2003

(54) PROCESS FOR CRYSTALLIZING AMORPHOUS LACTOSE IN MILK POWDER

(75) Inventors: Brian S. Baker, Millersberg, PA (US); Gregory T. Zerphy, Elizabethtown, PA (US); Brandt C. Cook, New Cumberland, PA (US)

(73) Assignee: Hershey Foods Corporation, Hershey, PA (US)

( * ) Notice: Subject to any disclaimer, the term of this patent is extended or adjusted under 35 U.S.C. 154(b) by 0 days.

(21) Appl. No.: 09/723,397

(22) Filed: Nov. 28, 2000

(51) Int. Cl.$^7$ .............................. A23G 1/00; A23L 2/39
(52) U.S. Cl. ..................... 426/588; 426/631; 426/659
(58) Field of Search ..................... 127/31; 426/658, 426/580, 588, 631, 659

(56) References Cited

U.S. PATENT DOCUMENTS

| | | | | |
|---|---|---|---|---|
| 2,197,804 A | * | 4/1940 | Lavett | |
| 2,439,612 A | * | 4/1948 | Peebles | |
| 2,477,558 A | * | 8/1949 | Almy | |
| 2,555,211 A | * | 5/1951 | Wallace | |
| 2,555,212 A | * | 5/1951 | Wallace | |
| 2,555,213 A | * | 5/1951 | Wallace | |
| 2,627,463 A | * | 2/1953 | Meade | |
| 2,768,912 A | * | 10/1956 | Peebles et al. | |
| 2,856,318 A | * | 10/1958 | Peebles | 127/31 |
| 3,639,170 A | * | 2/1972 | Hutton | |
| 3,785,865 A | * | 1/1974 | Pollard | |
| 3,802,914 A | * | 4/1974 | Nezbed | 127/58 |
| 4,099,983 A | * | 7/1978 | Wittenberg | 127/31 |
| 4,280,997 A | * | 7/1981 | Van Leverink | 127/31 |
| 4,293,572 A | | 10/1981 | Silva et al. | |
| 4,316,749 A | * | 2/1982 | Evans et al. | 127/31 |
| 4,342,604 A | * | 8/1982 | Evans et al. | 127/31 |
| 4,401,681 A | | 8/1983 | Dahle | |
| 4,404,038 A | * | 9/1983 | Credoz et al. | 127/16 |
| 4,496,604 A | | 1/1985 | Otsubo | |
| 4,504,502 A | | 3/1985 | Earle et al. | |
| 4,532,146 A | | 7/1985 | Durand et al. | |
| 4,594,110 A | * | 6/1986 | Kussendrager et al. | 127/31 |
| 4,710,228 A | | 12/1987 | Seaborne et al. | |
| 4,802,926 A | * | 2/1989 | Kussendrager et al. | 127/15 |
| 4,871,573 A | | 10/1989 | Bohren et al. | |
| 5,028,442 A | | 7/1991 | Zemelman et al. | |
| 5,051,265 A | | 9/1991 | Meister et al. | |
| 5,093,146 A | | 3/1992 | Calandro et al. | |
| 5,130,151 A | | 7/1992 | Averbach | |
| 5,254,353 A | | 10/1993 | Huang et al. | |
| 5,354,567 A | | 10/1994 | Huang et al. | |
| 5,393,538 A | * | 2/1995 | Chmiel et al. | 426/35 |
| 5,397,589 A | * | 3/1995 | Korte et al. | 426/580 |
| 5,401,518 A | | 3/1995 | Adams et al. | |
| 5,464,649 A | | 11/1995 | St. John et al. | |
| 5,543,164 A | | 8/1996 | Krochta et al. | |
| 5,626,900 A | * | 5/1997 | Miller | 426/580 |
| 5,672,373 A | | 9/1997 | Miller | |
| 5,766,659 A | | 6/1998 | Asama et al. | |
| 6,261,627 B1 | * | 7/2001 | Armstrong et al. | 426/584 |

FOREIGN PATENT DOCUMENTS

| | | |
|---|---|---|
| CA | 1329509 | 5/1994 |
| EP | 0 112 147 A2 | 6/1984 |
| EP | 0 451 491 A3 | 10/1991 |
| EP | 0 451 491 A2 | 10/1991 |
| EP | 0 465 802 A1 | 1/1992 |
| EP | 0 667 746 B1 | 8/1995 |
| EP | 0 717 595 B1 | 6/1996 |
| EP | 0 937 733 A2 | 8/1999 |
| GB | 2 167 934 A | 6/1986 |
| WO | WO 00/21380 * | 4/2000 |

OTHER PUBLICATIONS

Chidavaenzi, O. 1997. International J. of Pharmaceutics 159:67–74.*
Kedward, C. J. 2000. J. of Food Science 65(2)324.*
Arvanitoyannis, I. 1994. J. of Food Science 59(1)197.*
Kedward, C. J. 2000. Carbohydrate Research 329:423.*
Ziegler, G. 1999. Candy Industry, Jun. p. 50–54.*
Minifie, B. W. 1980. Chocolate, Cocoa and Confectionery. Science and Technology, 2$^{nd}$ edition. AVI Publishing Co., Inc. Westport, CT. p. 113–126.*
Roos, Y. 1992. J. of Food Science 57(3)775.*
Aguilar, C. A. 1994. J. of Food Science 59(6)1239.*
Aguilar, C. A. 1995. J. of Food Science 60(1)120.*
Darcy, P. 1997. International J. of Pharmaceutics 158:157.*

* cited by examiner

*Primary Examiner*—Carolyn Paden
(74) *Attorney, Agent, or Firm*—Scully, Scott, Murphy & Presser

(57) ABSTRACT

The present process is directed to a method of crystallizing the lactose in milkfat which comprises (a) mixing the milk powder with water in an amount sufficient to initiate crystallization when subjected to shearing and heating, and (b) subjecting the product of (a) to shearing and heating under conditions effective to crystallize the lactose, said heating being conducted at a temperature greater than the glass transition temperature of the lactose and below the temperature at which the product will have a burnt flavor.

44 Claims, No Drawings

PROCESS FOR CRYSTALLIZING AMORPHOUS LACTOSE IN MILK POWDER

FIELD OF THE INVENTION

The present invention relates to a process for crystallizing amorphous lactose in dried whole milk powder and to the chocolate products prepared therefrom.

BACKGROUND OF THE INVENTION

Dried whole milk powder is derived from whole milk and is used for a great variety of purposes. For example, whole milk powder is an ingredient in bakery products, such as dry baking mixes for the preparation of home-made cakes and the like. It is also used in the production of confectionary products, such as chocolate, e.g., milk chocolate, white chocolate, semi-sweet-chocolate, and the like.

The process of making milk chocolate requires several steps. In the first step, a nutritive carbohydrate sweetener, such as granulated sucrose is combined and mixed with cocoa butter, chocolate liquor and whole milk powder to form a paste. Next, in the refining step, essentially a fine grinding operation, the coarse paste from the mixer is passed between steel rollers and converted into a refined flake. The refining step breaks up the crystalline nutritive carbohydrate sweetener, cocoa butter, and milk solids such that the sizes of the particles are significantly reduced. This particle size reduction results in the desired smoothness of the chocolate. The third step is the conching step, which is a mixing-kneading step. In the conching step, the mixture is slurried while heating to give the final desired consistency of the milk chocolate. This mixing-kneading process allows moisture and volatile components to escape while smoothing the chocolate paste and is critical to the flavor and texture development of the chocolate. In the next step, i.e., the standardizing and finishing step, additional fat and emulsifier are added to the conched mixture to adjust the viscosity to the final specifications. The final step in obtaining the desired rheology of the chocolate is the tempering step, a process of inducing satisfactory crystal nucleation of the liquid fat in the chocolate.

Chocolate is a food substance which comprises chocolate liquor and cocoa butter, both derived from cocoa beans, and sugar. When milk chocolate is prepared, however, the formulation includes non-fat milk solids and milkfat as well. In order for the designation "milk chocolate" to be applied, however, there must be no less than 12% of milk solids included in the milk chocolate formulation.

The milkfat and non-fat milk solids in milk chocolate are derived from dried whole milk powder. Thus, whole milk powder is an ingredient of milk chocolate.

Dried whole milk powder is made from fluid milk and contains lactose, milk proteins, milk fat and milk minerals in the same relative proportions to one another as the milk from which it was made. Thus, the fat system in the milk chocolate is the combination or blend of the cocoa butter together with the butter fat carried into the chocolate formulation by dry whole milk powder.

The most common commercial process for preparing the milk powder is "spray drying". The effect of spray drying is, in any event, to use heat to evaporate the water constituent of whole milk and to remove it as water vapor. This process is performed quickly and does not provide sufficient time for the lactose in the milk powder to crystallize; as a result, the lactose is amorphous. Moreover, and more importantly, as a result of this process, a considerable portion—usually no less than about 85% of the fat constituent found in whole milk powder—becomes encapsulated in the serum solids, i.e., the amorphous lactose forms a matrix with the milk protein that encapsulates fat globules.

Thus, a particular problem that faces the chocolate maker is that only a certain amount of fat is available from the dry whole milk powder, which has been manufactured using traditional methods for production thereof, for entry into the chocolate formulation as a fat constituent. It can only be made available by further mechanical processing steps, whereby the fat is effectively squeezed out of its encapsulation carriers and added to the formulation for use as fat. This can be accomplished by passing the blended cocoa butter and chocolate liquor, sugar, and dry whole milk between closely spaced rollers so as to refine or conch the product. Indeed only about 60% of the fat content of conventional dry whole milk powder is available for fat extraction after refining and entry into the chocolate formulation as fat. It is believed that 40% or so of the fat constituent which is encapsulated in the serum products of the dry whole milk can not easily be removed so as to become available as fat. What that means is that as the dry whole milk enters into the formulation of the food product, such as the milk chocolate, the unrecoverable fat is not available to enter the fat system of the food product and is thus unavailable as fat during further preparation steps, and cannot be used to facilitate the preparation thereof, as e.g., for lubrication.

If the product is not fully refined or conched, and milkfat is utilized in the food product formulation, especially when the food product is milk chocolate, then there may in fact be a higher amount of fat present in the food product than is useable. That unusable fat nonetheless enters the body of the person consuming the food product as fat nutrient. Still further, of course, that unavailable fat constituent does not enter into the fat system with cocoa butter, for example, as the milk chocolate is being prepared.

Moreover, in the amorphous state, lactose is hygroscopic. A small portion of water, sometimes up to 5%, may also be encapsulated or bound in the protein constituent of the milk and cannot be removed therefrom. Further, the moisture absorbing property of the powdery milk is so high, that if placed in water, the milk powder absorbs water to form a syrup layer. It has been found that when the moisture content of the powder approaches 7% or higher, the amorphous state of the lactose will change and crystallization of lactose will occur. However, when lactose in milk powder crystallizes in this manner, as a consequence of moisture absorption, problems with caking and lumping occur. More specifically, when placed in water, the contact portion of the powder with water is rapidly made wet and forms a highly viscous syrup layer, with the result that the capillary space leading into the inner region of the powdery means is plugged to prevent water from permeating into the powdery mass. It follows that the powdery milk forms lumps and is not dissolved in water. Moreover, the simultaneous occurrence of non-enzymatic browning occur when lactose is crystallized in this manner.

It follows, therefore, that the chocolate industry, in particular, recognizes the difficulties in formulating milk chocolate when not all of the fat from the dry whole milk powder constituent being used is available as fat.

One solution of this problem is described in WO 00/21380 in which the milk powder is processed at elevated temperatures with shear in a mixing or grinding device such as a 2"

or 5" continuous process or manufactured by Readco Manufacturing Company in York, Pa., to form a milk powder containing crystallized lactose. However, the patent application notes on Page 8 thereof that "There was a noticeable rise in the power requirements of the processor as the lactose crystallized." The present inventors also observed that when crystallization of the lactose starts, the viscosity of the mass increases significantly and the power requirement literally increases dramatically, e.g., from 5 Hp to 40 Hp, within seconds. They further noted that the kinetics of the reaction is uncontrollable, and the products either burn or the processor overloads.

The present inventors thus searched for a process which would impart enough energy to crystallize the lactose in the milk powder, but required less energy input than the process described hereinabove, and which was not accompanied by the huge power surge as described hereinabove. The present inventors found such a process.

The present invention, however, avoids the difficulties described hereinabove including the power surge described hereinabove. The present inventors have found that proper crystallization of lactose in the milk powder can be obtained and the difficulty described in WO 00/21380 can be overcome if simultaneous with or prior to the heating and shearing, the milk powder is contacted with a sufficient amount of water.

The present inventors have found that their method is a fast and efficient means of converting the amorphous lactose in the dry milk powder to the crystalline form. Moreover, when the lactose is crystallized in accordance with the present process, the inherent problems of caking, lumping and browning associated with prior art milk powders is significantly mitigated and/or even eliminated.

SUMMARY OF THE PRESENT INVENTION

So as to provide for the production of dry milk powder which has substantially all of the fat constituent recoverable as free fat when the dry milk powder is blended as dry whole milk powder into milk chocolate, dry baking mixes or other foods, the present invention provides a method for crystallizing the lactose in the milk powder and liberating the encapsulated fat. The process comprises contacting the milk powder with water in an amount sufficient to initiate crystallization of the lactose when subjected to heat and shearing forces and then subjecting the thus treated milk powder to shear at a temperature at or above the glass transition temperature of the lactose. The present invention is also directed to the process of making chocolate which comprise crystallizing amorphous lactose in milk powder in a process which comprises preparing a milk powder containing the crystalline lactose by the present method, then mixing the thus formed milk powder with chocolate liquor, cocoa butter and refined nutritive carbohydrate sweetener and optionally additional fat and emulsifier under conditions to form homogeneous mixture, standardizing the thus formed mixture and tempering the mixture.

DETAILED DESCRIPTION OF THE INVENTION

In an embodiment of the present invention, the present process is directed to crystallizing the amorphous lactose in the dry milk powder. This process thereby produces a milk product in which the entrapped fat is substantially liberated and in which the lactose is crystalline (hereinafter referred to as crystallized milk powder). The product produced is a dispersion of lactose and milk protein in a continuous milkfat phase. Thus, the fat from the milk powder is freely available and is a recoverable fat constituent.

The crystallization of lactose and the liberation of the fat not only offer several advantages to the milk powder but also to the product containing the milk powder.

First, the liberated fat resulting from the crystallization of the lactose enhances the sensory properties of the food product. For example, the use of the crystallized milk powder enhances the rheological properties of milk chocolate, improving the texture and mouthfeel. In the production of milk chocolate, the available fat from the whole milk powder which is added to the chocolate formulation is miscible with the cocoa butter and blends with it to form the continuous fat system of the milk chocolate. Although the cocoa butter and butter fat from the dry milk powder have quite dissimilar characteristics, the butter fat liberated in the milk powder containing the crystallized lactose can be available to soften the texture of chocolate products and be available for anti-blooming properties milkfat exhibits in milk chocolate products.

The chocolate product prepared from the crystalline milk powder produced in accordance with the present process does not possess any abnormal attributes that would alter the tempering regime. Furthermore, since the amount of free milkfat is increased by the present process, surface bloom by which a white or gray sheen appears at the surface of the chocolate is substantially retarded relative to the use of whole milk powder containing amorphous lactose.

Moreover, by crystallizing the lactose and liberating the embedded fat, the total fat percentage utilized by the chocolate maker in producing milk chocolate may be reduced while maintaining the rheological properties. This occurs since there is no bound fat nor the requirement to conch or refine the product so as to release bound fat. Substantially all of the fat in the milk powder is utilized, thereby reducing the amount of fat that needs to be added. Moreover, by utilizing the embedded fat, greater distribution and lubrication within the chocolate product is achieved. Milk chocolate is a suspension of milk solids, sugar and other solids within a finely divided fat system; and when all of the fat is available, and not embedded in the milk powder, less fat needs to be added to achieve the desired sensory and Theological properties of the chocolate. Thus, the total amount of fat used to render the specific milk chocolate properties is reduced. This in turn reduces the cost of production of milk chocolate, since generally the fat content of the milk chocolate is the most expensive ingredient thereof.

Further, the use of crystallized lactose densifies the milk powder. Using the more dense milk powder resulting from the crystallization of lactose also enhances the rheology of the chocolate The use of crystallized lactose in the milkfat in chocolate products has another advantage. Inasmuch as amorphous lactose is hydroscopic, chocolate prepared therefrom has a crumbly texture, if exposed to a high humidity atmosphere. On the other hand, the chocolate products containing crystallized lactose is more stable during storage. Thus, the onset of the crumbly texture in chocolate is minimized and/or retarded by using milk powder containing crystallized lactose.

All of these advantages are achieved and realized by utilizing the process of the present invention to crystallize lactose in the milk powder.

The process for crystallizing the lactose and liberating the embedded fat requires two steps: (a) the addition of an aqueous solution or suspension which, once the lactose begins to crystallize, no more additional aqueous solution or suspension is necessary; and (b) the heating and shearing of the wetted milk powder.

In the first step, the milk powder is contacted with aqueous solution or suspension such as fruit juice, milk, water, and the like. It is preferred that the aqueous solution is water. The water utilized is preferably substantially pure, i.e., is substantially free from minerals and is substantially free from impurities. It is preferred that the water utilized is at least 90% pure. Although distilled water and deionized water may be used, the most preferred water in the present process is tap water.

The remainder of the description herein describes the process utilizing water. However, it is to be understood that the description hereinbelow with respect to the water is also applicable if other aqueous solutions or if aqueous suspensions are utilized in the process described herein.

The amount of water utilized is sufficient to initiate crystallization when the milk powder is subjected to heating and shear forces in the second step. The amount of water utilized is less than about 10% by weight of the milk powder. More preferably, the amount of water in contact with the milk powder is greater than 0% and preferably ranges from about 1% to about 6% by weight and more preferably ranges from about 1.5% to about 5% by weight and even more preferably ranges from about 2% to about 4% by weight and most preferably the amount of water in contact with the milk powder is about 3% by weight. The water is preferably mixed with the dry milk power using conventional mixing devices known in the art.

The water may be added all at once or it may be added over a period of time to achieve the desired amounts. Of course, the type of process, whether it be continuous or batch, will determine the rate of water addition. Inasmuch as the addition of water has a negative impact on the rheology of chocolate, it is desirable that the amount of water added to the dry milk powder is minimal. It is preferred that the water is added at a rate of about 0.2% by weight of the dry powder per hour to about 10% by weight of the milk powder per hour, and more preferably from about 1% per hour to about 5% per hour and most preferably at about 3% per hour.

It is preferred that the water is added to the dry milk powder. Thus, it is preferred that the amount of water added should not exceed about 10% by weight of the milk powder. It is more preferred that the moisture content of the dry milk powder after the addition of water thereto is less than about 10% by weight. It is even more preferred that the amount of water added to the milk powder does not exceed about 6% by weight of the dry milk powder and more preferably is no more than about 5% by weight of dry milk powder; and it is most preferred that it is about 3% by weight of dry milk powder. It is more preferred that the moisture content of the milk powder after the water addition is less than about 7.5% by weight, and more preferably, between about 5% to about 7.5% by weight. If during the water addition, the moisture content of the milk powder exceeds 10% by weight thereof, then the excess water is evaporated off using conventional techniques known to one of ordinary skill in the art.

The water is added to the milk powder by any conventional means, but preferably by conventional means in which the rate of addition of the water is controlled. In a preferred embodiment, the water is automatically fed into the entrance of the shearing apparatus, which also contains milk powder which has not yet been subjected to shearing and heating, and the water is mixed with the milk powder at the entrance of the shearer.

The second step in the process is to subject the water treated milk powder to heating at a temperature greater than the glass transition temperature of the lactose and to shearing.

The heat should be applied at a temperature sufficient to crystallize the lactose, the temperature being greater than the glass transition temperature of the lactose in the water-treated milk powder. The heat may be applied externally. However, heat is generated from the shear, thus, the heat applied to the water treated milk powder must take into account the heat generated from shearing as well as the external heat source. However the product provided should not have a burnt flavor. Thus, the temperature should be less than that temperature which results in burnt flavor. Excessive heat or overheating should be avoided. As used herein, the term "overheating or excessive heating" refers to that amount of heat that results in burnt flavors of the crystallized milk powder.

The heat may be a moist heat or a dry heat. The heat is controlled by devices and/or means known to one of ordinary skill in the art. For example, it is preferred that the shearing device has a means of controlling the heat. For example, the shearing device may contain a jacket surrounding the shearing device. Alternatively, the shearing device may contain a means for applying direct heating to the shearing parts thereof.

Besides heating, the wetted milk powder is subjected to shearing and mixing which takes place in a suitable apparatus. Without wishing to be bound, it is believed that the shear in combination with the heat helps to liberate the entrapped fat and helps promote the crystallization of the lactose. In addition, the shear maintains the lactose crystals as smaller particle sizes as well as prevents clumping of the milk powder. The heating and shearing of the milk powder is performed under conditions effective to crystallize the lactose in the milk powder. It is preferred that the shearing device imparts a shear of from about 420 $s^{-1}$ to about 3000 $s^{-1}$.

The milk powder in the shearing device is forced to flow past a plurality of shears in the shearing device, and as it passes, it is subjected to shearing. It is preferred that the powder is fed into the shearing device at a rate of about 100 lbs/hr to about 700 lbs/hr. It is also preferred that the shearing device is a twin screw processor wherein the screw speed ranges from about 100 rpm to about 700 rpm. In the shearing device, the powder is subjected to heating at a temperature above the glass transition temperature of the wetted crystallized milk powder, preferably from about 80° F. to about 250° F. and more preferably from about 200° F. to about 225° F.

The shearing and heating may be controlled by devices known in the art, e.g., automatic controls or it may be controlled manually by an operator. Moreover, the milk powder is preferably fed by automatic means known to one of ordinary skill in the art.

Suitable shearing devices useable in the present process include a continuous processor with a number of paddle configurations, extruders, such as a twin screw extruder and the like, which are commercially available. A preferred shearing device is a 2" and a 5" Continuous Processor, manufactured by Readco Manufacturing, Inc. in York, Pa., which are high-shear, twin-screw mixing devices.

The following is illustrative of the type of extruder that could be utilized in the present process.

The Continuous Processor is a twin-shaft co-rotating mixer. The 2" and 5" processor are driven by a 3.75 KW (5 hp) and 30 KW (40 hp) selective motor. The continuous processor accomplishes homogeneous mixing, kneading and shearing and crystallization utilizing "paddles" or processing elements positioned on the shafts in the processor. The processor has three types of paddles; flat, forward helix; and reverse helix paddles. The forward helix paddles are utilized for conveying the material through the processor, while both the reverse and flat paddles are utilized for mixing and shearing the water treated milk powder.

In a continuous processor, the powder enters the processor at one end by means of a feeding screw, which feeds the powder into the processor. The feeder is controlled by conventional methods known in the art, such as a microcontroller. The powder moves through the processor by the spatial configuration of the paddles. The powder is subjected to the various paddle types and their position which effects the shearing and mixing. The processor's paddles and feeding screws are configured in a manner for lactose crystallization to occur uniformly under stable processing conditions.

The processor has a circulating water heater which is used to heat the milk powder and control the temperature. It also has a control panel which displays the thermocouple sensor's reading and the power consumption of the processor.

In a preferred embodiment, dry milk powder and water are fed into the Readco Manufacturing Continuous Processor at a screw speed of about 100 rpm to 700 rpm and at a rate of about 100 lbs/hr to about 700 lbs/hr. The jacket temperature of the processor is maintained at about 80° F. to about 250° F. and more preferably from about 100° F. to about 225° F., i.e., temperatures above the glass transition temperature of lactose in the milk powder. The milk powder is conveyed through the processor by the spatial configuration of the paddles. As the powder moves through the processor, it is subjected to a plurality of paddles. In a preferred embodiment, the arrangement of paddles is a series of three reverse paddles arranged in a reverse helical pattern that tend to build a "product dam". More specifically, the three reverse paddles are arranged in a spatial configuration sufficient to impede the progress of the milk powder as it is conveyed through the apparatus to permit sufficient energy to be imparted to the milk powder to crystallize the lactose in the milk powder and to even the flow of the milk powder through the unit, so as to avoid power surging. By retarding the flow of milk powder through the apparatus in this manner, a "product dam" is formed. Thus, the milk powder is conveyed through the apparatus under conditions sufficient to create the product dam. These product dams permit sufficient energy input to the milk powder to initiate crystallization. The shear rates in the continuous processor preferably vary from about 420 s$^{-1}$ to about 3000 s$^{-1}$.

The product exits the shearing device in a texture of a paste. It is preferred that the texture is similar to the texture of chocolate mass after being subjected to conching. The product produced by the present process has a slight caramel-like flavor typical of crumb based chocolate.

Optionally, an emulsifier such as lecithin, may be added to the milk powder. The emulsifier may be added prior to or during water treatment of the milk powder or it may be added during the shearing and heating step. Preferably, it is added during the shearing and heating step. The emulsifier is added in emulsifying effective amounts and helps to improve the grinding and shearing of the lactose crystals. In addition, it also helps to control overheating.

The water treatment in the present process is critical and serves two functions. The present inventor noted that when the milk powder was not treated with water but was immediately subjected to shearing, as described in WO/0021380, there was a noticeable rise in the power requirements of the processor as the lactose crystallized. The lactose crystals were beginning to clog the shearing device, and began overloading the machine. However, when the water was added in the first step, as described hereinabove, there was no overloading of the machinery and there was no power spikes or if present, it was significantly lower. The water treatment step made the process much more efficient and lowered the energy input required to crystallize the lactose crystals in the milk powder. Thus, the present process has significant advantages over the process described in WO/0021380.

In a preferred embodiment, the milk powder is fed into the shearing device and then water is fed into the shearing device, contacting the milk powder as described hereinabove prior to the milk powder being subjected to shearing or heating. However, once crystallization is initiated, no further water is required. In fact, if the milk powder is to be used in making chocolate, it is preferred that the amount of water added to the milk powder is controlled, as described hereinabove, as increased water levels in chocolate adversely affects its rheological properties.

Without wishing to be bound, it is believed that the addition of water facilitates the conversion of the lactose from an amorphous solid to a crystalline solid, which is the most stable form of lactose.

Crystallization of the lactose is a function of its glass transition temperature ($T_g$) thereof. $T_g$, as used herein, is the temperature at which an amorphous solid changes from a brittle stiff, hard and amorphous mass to a rubbery soft, limp, viscous liquid. Below the glass transition temperature, the lactose has a relatively fixed configuration and little or no translation or rotational motion. Above the glass transition temperature, the amorphous sugar starts to gain sufficient thermal energy for rotational motion and considerable torsional oscillation to rearrange itself into a crystal. During the glass transition, no latent heat is absorbed; instead there is a change in both physical and chemical properties, e.g., there is a change in refractive index, viscous flow, hardness, load bearing capacity, thermal expansivity, specific heat, coefficient of expansion, compressibility, specific heat, and the like. Moreover, the glass transition is not sharp but occurs over a temperature of several degrees, and $T_g$ is taken as the midpoint of the temperature interval in which this change occurs. The rate of crystallization of the lactose is dependent upon the size of the temperature range. It is believed to be dependent upon the difference between $T_g$ and the highest temperature at which the changes described hereinabove stop occurring, ($\Delta T_g$) For lactose, it is believed to be rather large since the literature refers to the rate of lactose crystallization of milk powder in storage in terms of hours and days. Therefore, to facilitate crystallization to occur, it requires a lower $T_g$, i.e., a larger $\Delta T_g$. To achieve this, it is necessary to either increase the energy input into the process or decrease $T_g$.

$T_g$ is dependent on moisture content and decreases very sharply even in low moisture ranges.

Without wishing to be bound, it is believed that the addition of water, as described herein, lowers $T_g$. However, in the absence of water the inventors have found that the temperature of the milk powder has to increase to at least 195° F. with shear to initiate crystallization. When crystallization starts, the viscosity of the mass increases tremendously, presumably because the change of the amorphous lactose into its rubbery state is relatively slow. The power requirement literally goes from 5 HP to 40 HP within seconds, and the product either burns or the machine overloads. The kinetics of the reaction is uncontrollable. Thus, one of the problems facing the present inventors was to find a mean to raise the temperature of the milk powder above its $T_g$ without inputting additional energy. At a reduced $T_g$, the process requires substantially less energy of input or the reaction will be faster at the same energy input. Thus water is added to the milk powder in effective amounts to lower the glass transition temperature of the lactose in the milk powder.

Since commercial dry milk powder has a moisture content of 2.5–3.0% and a $T_g$ of approximately 160° F., it was not obvious that the addition of additional water to the milk powder would facilitate the process and produce the desired product since as the amount of water increases, the Casson yield stress of chocolate, which is an end product for which the dry milk powder is utilized, also increases. Chocolate requires a Casson yield value within a specified range to maintain the proper rheological values; above that value, the chocolate thus formed loses its rheological properties.

However, the inventors have found that when water is added in accordance with the present invention lactose crystallization thereof occurred more quickly than achieved heretofore. More specifically, when the water was fed into the milk powder at a rate of about 3% per hour for 10 minutes, and then subjected to the shearing and heating as described in Example 1 hereinbelow, the crystallization occurred in less than a minute and more specifically less than 30 seconds and even more specifically within 10–15 seconds. The inventors have found that when 3% water by weight is added, the power requirement reduces from something greater than 40 Hp (no water) to approximately 18 to about 22 Hp (3% water).

Once the crystallization starts, the process runs very efficiently. The crystallization process breaks the protein/lactose matrix surrounding the milkfat, and the milkfat is released. The released milkfat acts as a processing aid. In addition, there is new crystalline lactose present to help seed incoming fresh powder.

Thus, water addition is used to initiate the crystallization. Once lactose crystals are formed, no more water addition is required, although water, if desired, may be added in accordance herewith. However, it is preferred that once lactose crystals are formed, there is no additional water added and any added milk powder to be treated is added directly to the shearer.

Although some product may be removed from the shearer during the processing, it is important to keep some lactose crystals present in the shearer to avoid the necessity of repeating the water treatment step.

The product produced in accordance with the present invention is crystallized milk powder. The milk powder formed from the present process has the characteristics of milk powder containing crystalline lactose. Moreover, substantially all of the milk fat embedded in the dry milk powder is released. By substantially, it is meant at least 90% by weight of the milkfat present is liberated and more preferably at least 95% by weight of the milkfat present is liberated. Utilizing the present process in the most preferred embodiment, 99% of the embedded fat and even close to 100% of the embedded fat is liberated.

Moreover, the milk powder prepared in accordance with the present process has physical characteristics different from the starting dry milk powder. The dry milk powder being subjected to the present process is a white powder. After the process, it becomes light yellow in color and dough-like in consistency. It is malleable and can be molded into shapes, like a cube.

Moreover, the crystallized milk powder product contains less moisture than the dry whole milk powder. Preferably, it contains about 0.2% to above 0.5% less moisture than that of dry milk powder.

To retard the oxidation of the milk powder, especially if it is to be stored for an extended period of time, it is preferred that an anti-oxidant is added to the milk powder in an anti-oxidizing effective amount.

The milk powder with or without the anti-oxidant produced in accordance with the present invention may be used in any products where dry milk powder is normally utilized. Examples include foods such as milk chocolate, sweet chocolate, semi-sweet chocolate and white chocolate. The desired product will ultimately determine which additional ingredients are to be mixed with the crystallized milk powder prepared in accordance with the present invention.

For example, the milk powder thus formed can be homogenously mixed with chocolate liquor and/or anti-oxidants, such as tocopherol, normally used in making chocolate or white chocolate, respectively. It is preferred that the milk powder be mixed with the chocolate liquor or anti-oxidants, shortly after its production.

The inventors have found that the chocolate liquor retards oxidation of the free milkfat, and thus acts as an antioxidant. Chocolate liquor has natural antioxidants which protect the milkfat in the milk powder from going rancid. The thus treated milk product mixed with chocolate liquor is used in the manufacture of chocolate products, such as milk chocolate, sweet chocolate or semi-sweet chocolate.

In another embodiment, the milk powder formed after the water and shearing and heating treatment described hereinabove is mixed with an anti-oxidant in anti-oxidizing effective amounts and then the thus treated milk powder is used in the manufacture of white chocolate products.

In making chocolate products it is preferred that the milk powder thus formed is mixed immediately or shortly thereafter with the anti-oxidant or chocolate liquor. The liquor or anti-oxidant could be mixed externally of the processor or shortly after the crystalline milk powder exits the processor or it could be injected into the processor near the discharge. Preferably, the ratio of crystallized milk powder to chocolate liquor ranges from about 50:1 to about 1:1 and more preferably from about 10:1 to about 1:1 and most preferably at about 1.4:1 to make milk chocolate. The aforementioned ranges with respect to the ratio of crystallized milk powder to chocolate liquor may also be used to make semi-sweet or sweet chocolate. However, if white chocolate is desired, an anti-oxidant, e.g., tocopherol, is utilized in lieu of chocolate liquor. The amount of anti-oxidants e.g., tocopherol, ranges from about 0.01% to about 0.15% by weight and more preferably from about 0.045% to about 0.115% and most preferably at about 0.08% by weight.

The milk powder/chocolate liquor or milk powder/anti-oxidant mixture is then mixed with the other components normally used to make chocolate. For example, the chocolate liquor/milk powder mixture can be mixed with refined carbohydrate sweetener, such as sugar, emulsifier, such as lecithin, and any other additional ingredients normally used in chocolate making. The mixture is then standardized and tempered in accordance with known techniques in the art. The chocolate product can then be utilized in the desired manner. Thus, for example, it may molded to the desired shapes by standard techniques to make the desired chocolate product. Alternatively, it may be used as a coating to enrobe a cracker, wafer, cookie and the like or it may be used to enrobe an inclusion, such as nut, fruit, creme, filling, caramel and the like. Alternatively, it may be admixed with an inclusion.

Alternatively, the milk product prepared in accordance with the present invention can be utilized in place of the milkfat solids in the process described in U.S. Pat. No. 5,080,923, to Martin, Jr., et al. the contents of which are incorporated by reference. Alternatively, the milk powder produced by the present invention can be used in lieu of the milk powder utilized in any one of the processes described in U.S. Pat. No. 5,464,649 to St. John, et al., the contents of which are incorporated by reference.

The present process is also applicable for non-fat dry milk; that is, the process hereinabove can be used to crystallize the lactose in non-fat dry milk, which product can be used in any one of the processes for making chocolate described herein or in U.S. Pat. Nos. 5,080,923 and 5,464,649 referred to hereinabove. When using non-fat dry milk in place of whole milk powder in the shearing and heating treatment described hereinabove, fat e.g., cocoa butter, is added to the non-fat dry milk prior to the shearing and heating step, and more preferably prior to or while feeding the non-fat dry milk into the processor, e.g., Readco processor, either during or after the water treatment step. The amount of cocoa butter utilized ranges from about 20% to about 36% by weight and more preferably from about 25% to about 30% by weight, and most preferably at about 28% by weight, while the range of crystallized milk powder utilized ranges from about 80% to about 64% by weight and more preferably from about 75% to about 70% by weight and most preferably at about 72% by weight. Thus, the weight ratio of crystallized milk powder to cocoa butter ranges from about 4:1 to about 1.7:1 and more preferably from about 3:1 to about 2.3:1 and most preferably at about 2.6:1.

As used herein, the term dry milk powder is being used, in accordance with the U.S. Food and Drug Administration definition thereof. It contains the lactose, milk proteins, milkfat and milk minerals, in the same relative proportions to one another as the milk from which it was made. The dry whole milk must contain not less than 26% by weight but less than 40% by weight of milkfat on as is basis. Moreover, dry whole milk must contain not more than 5% by weight of moisture on a milk solid—not fat basis—and preferably contains less than 3% by weight of moisture on a milk solid—not fat—basis.

Thus, prior to utilizing the milk powder, it is preferred that its moisture content be measured, which may be effected by conventional means. If the milk powder contains a higher moisture content then the dry milk powder described herein, then the amount of water added to the powder is reduced accordingly.

As used herein, the term "crystallized milk powder" is milk powder containing crystallized lactose and, minimal, if any, amorphous lactose.

Unless indicated to the contrary, the % refers to the % by weight relative to the dry milk powder.

The following non-limiting examples further illustrate the present invention.

EXAMPLE 1

Whole milk powder was fed into a READCO 5" Continuous Processor at a rate of 500 lb/hr. The shaft speed was 400 rpm (shear rate of 1700 s$^{-1}$) and the temperature of the jacket was 175° F. The Readco processor has 28 pairs of paddles arranged in a very specific configuration. Pairs 1 through 4 are flat paddles arranged 900 to each other. Pairs 5 through 8 are reverse helix paddles arranged in a reverse spiral. Pairs 9 and 10 are forward helix paddles arrange in a forward spiral. Pairs 11 through 16 and pairs 17 through 22 are a repeating pattern of pairs 5 through 10. All remaining pairs (23 through 28) are forward helix paddles arranged in a forward spiral. The three reverse spirals (pairs 5–8, 11–14, 17–20) are necessary to impede the progress of the milk powder so that sufficient energy is imparted and to even the flow of milk powder through the unit, as to avoid any surging.

Water was added at a rate of 15 lb/hr for 10 minutes. Then no further water was added. Using the discharge gate of the processor, approximately 24 hp work input was maintained. The crystallized milk powder discharged at approximately 215° F. and had the consistency of "Playdough". As the process continued, it was preferable to continually decrease the Readco's jacket temperature as to keep the temperature of the milk powder below 215° F.

EXAMPLE 2

The product of Example 1 was externally mixed with 110° F. chocolate liquor at a ratio of 70% crystallized milk powder to 30% chocolate liquor.

EXAMPLE 3

The product prepared in accordance with Example 1 was mixed with milk chocolate. The thus prepared chocolate was used for an enrobed wafer product bar. The product was given to tasters and then ranked for overall liking. As a control, a commercial enrobed wafer product containing anhydrous non-fat dry milk was prepared and given to the taste testers. The taste testers rated the enrobed wafer product prepared using the milk powder prepared in accordance with the present invention as compared with the commercially available enrobed water product.

The taste testers found that they preferred the enrobed wafer product containing the crystallized milk powder prepared by the process of the present invention over the commercial enrobed wafer product containing the anhydrous non-fat dry milk. More specifically, when the two products containing the same amount of non-fat milk solids were compared, the taste testers overwhelmingly preferred the enrobed wafer product containing the milk powder containing the crystallized lactose prepared in accordance with the present invention.

The above preferred embodiments and examples are given to illustrate the scope and spirit of the present invention. These embodiments and examples described herein will make apparent to those skilled in the art other embodiments and examples. These other embodiments and examples are within the contemplation of the present invention. Therefore, the present invention should be limited only by the appended claims.

What is claimed is:

1. A process for converting the amorphous lactose in dry milk powder to crystalline lactose, which comprises:
   (a) contacting the milk powder with water in an amount sufficient to initiate crystallization of lactose when subjected to shearing and heating;
   (b) subjecting the water-contacted powder to a temperature above the glass transition temperature of the milk powder product of step (a) but below that temperature at which the product will have a burnt flavor, and shearing under conditions effective to crystallize the lactose.

2. The process according to claim 1 wherein the water utilized is substantially pure.

3. The process according to claim 1 wherein the water utilized is tap water.

4. The process according to claim 1 wherein the milk powder is contacted with water in an amount ranging from 0% to about 10% by weight of the milk powder.

5. The process according to claim 1 wherein the milk power is contacted with water in an amount ranging from about 1% to about 6% by weight of the milk powder.

6. The process according to claim 1 wherein the milk powder is contacted with about 3% water by weight.

7. The process according to claim 1 wherein the shear rate ranges from 420 $s^{-1}$ to about 3000 $s^{-1}$.

8. The process according to claim 1 wherein the product of (a) is heated at a temperature ranging from about 80° F. to about 225° F.

9. The process according to claim 1 wherein the shearing is done using a twin screw mixing device.

10. The process according to claim 1 wherein 1% to about 6% of water is mixed with the milk powder and the milk powder is subjected to shearing ranging from about 420 $s^{-1}$ to 3000 $s^{-1}$ and a temperature of about 100° F. to about 225° F.

11. The process according to claim 10 wherein the shearing device is a twin screw mixing device and the screw speed ranges from about 100 rpm to about 700 rpm.

12. The process according to claim 10 wherein the milk powder is in contact with about 1% to about 6% water relative to the weight of the milk powder.

13. The process according to claim 10 which additionally comprises (c) mixing the product of step (b) with chocolate liquor.

14. The process according to claim 13 wherein the liquor is added in an amount of 3% to about 30% by weight of the milk powder.

15. The process of claim 1 wherein an emulsifier is present with the milk powder and water.

16. The process of claim 1 wherein the emulsifier is lecithin.

17. The process according to claim 1 which additionally comprises (c) mixing the product of step (b) with chocolate liquor.

18. The process according to claim 15 wherein the liquor is added in an amount of 3% to about 30% by weight of the milk powder.

19. The process according to claim 1 wherein step (b) comprises conducting the heating and shearing in a continuous processor in which the wetted milk product is subjected to heating and is conveyed through the processor by a plurality of paddles so arranged as to impart shearing forces to the milk powder.

20. The process according to claim 19 wherein paddles are arranged in a spatial configurations sufficient to impede the progress of the milk powder through the processor to permit sufficient heat to be imparted to the milk powder to effect crystallization of the lactose therein and to even the flow of the milk powder through the processor.

21. A process for crystallizing lactose in nonfat milk powder which comprises:
(a) mixing the non-fat milk powder with fat in an amount of about 20% to about 36% by weight of the milk powder and water in an amount effective to lower the glass transition temperature of the lactose therein and initiate crystallization thereof when subjected to heating and shearing;
(b) subjecting the product of (a) to heating and shearing under conditions effective to crystallize the lactose, said heating temperature ranging from above the glass transition temperature of the product of a temperature but below that temperature wherein the product has a burnt flavor.

22. The process according to claim 21 wherein the water is mixed with the nonfat milk powder in an amount ranging from about 1% to about 6% and the water treated milk powder is subjected to temperature of about 80° F. to about 225° F. and subjected to shear of about 420 $s^{-1}$ to/about 3000 $s^{-1}$.

23. The process according to claim 21 wherein fat is added to the milk powder product of step (b).

24. The process according to claim 23 wherein the fat is cocoa butter.

25. A process for making chocolate which comprises:
(a) contacting milk powder containing amorphous lactose with water in an amount sufficient to initiate crystallization of lactose when subjected to shearing and heating;
(b) subjecting the water contacted powder of step (a) to a temperature above the glass transition temperature of the milk powder product of (a) but below that temperature at which the product will have burnt flavor and shearing under conditions effective to crystallize, the lactose;
(c) mixing the product of (b) with chocolate liquor, cocoa butter, refined nutritive carbohydrate sweetener and optionally an emulsifier and additional fat under conditions sufficient to form a homogeneous mixture; and
(d) tempering the product of (c).

26. The process according to claim 25 wherein the milk powder in step (a) is contacted with water in an amount ranging from about 0% to about 10% by weight of the milk powder.

27. The process according to claim 25 wherein step (b) the milk powder is subjected to a temperature ranging from about 100° F. to about 225° F. and a shear rate of about 420 $s^{-1}$ to about 3000 $s^{-1}$.

28. The process according to claim 25, wherein step (b) the milk powder is subjected to a temperature ranging from about 100° F. to about 225° F. and a shear rate of about 420 $s^{-1}$ to about 3000 $s^{-1}$.

29. The process according to claim 19 in which the emulsifier is present.

30. In a process of producing chocolate in which milk powder, cocoa butter, non fat milk solid, chocolate liquor, and nutritive carbohydrate sweetener and optionally an emulsifier are subjected to mixing, refining, conching, standardizing, tempering and molding, the improvement comprising utilizing dry whole milk powder in which the milk powder contains crystallized lactose, the crystallized lactose in the milk powder being prepared by a process comprising:
(a) contacting milk powder containing amorphous lactose with water in an amount sufficient to initiate crystallization of lactose when subjected to shearing and heating; and
(b) subjecting the water contacted powder of (a) to a temperature above the glass transition temperature of the milk powder product of (a) but below that temperature at which the product will have burnt flavor and shearing under conditions effective to crystallize the lactose, thereby forming crystallized milk powder.

31. The improved process according to claim 30 wherein the milk powder in step (a) is contacted with water in an amount ranging from about 0% to about 10% by weight of the milk powder.

32. The improved process according to claim 30 wherein step (b) the milk powder is subjected to a temperature ranging from about 100° F. to about 225° F. and a shear rate of about 420 $s^{-1}$ to about 3000 $s^{-1}$.

33. The improved process according to claim 30 in which the chocolate is milk chocolate, sweet chocolate or semi-sweet chocolate.

34. The improved process according to claim 30 in which the crystallized milk powder and chocolate liquor are present in a weight ratio of crystallized milk powder to chocolate liquor ranging from about 50:1 to about 1:1.

35. The process according to claim 30 wherein the emulsifier is present.

36. A process for making chocolate which comprises:
   (a) contacting milk powder containing amorphous lactose with water in an amount sufficient to initiate crystallization of lactose when subjected to shearing and heating;
   (b) subjecting the water contacted powder of step (a) to a temperature above the glass transition temperature of the milk powder product of (a) but below that temperature at which the product will have burnt flavor and shearing under conditions effective to crystallize the lactose;
   (c) mixing the product of (b) with cocoa butter, refined nutritive carbohydrate sweetener and optionally an emulsifier and additional fat under conditions sufficient to form a homogeneous mixture; and
   (d) tempering the product of (c).

37. The process according to claim 36 wherein the milk powder in step (a) is contacted with water in an amount ranging from about 0% to about 10% by weight of the milk powder.

38. The process according to claim 36 wherein the emulsifier is present.

39. In a process of producing chocolate in which milk powder, cocoa butter, non fat milk solid, anti-oxidant and nutritive carbohydrate sweetener and optionally an emulsifier are subjected to mixing, refining, conching, standardizing, tempering and molding, the improvement comprising utilizing dry whole milk powder in which the milk powder contains crystallized lactose, the crystallized lactose in the milk powder being prepared by a processed comprising:
   (a) contacting milk powder containing amorphous lactose with water in an amount sufficient to initiate crystallization of lactose when subjected to shearing and heating; and
   (b) subjecting the water contacted powder of (a) to a temperature above the glass transition temperature of the milk powder product of (a) but below that temperature at which the product will have burnt flavor and shearing under conditions effective to crystallize the lactose.

40. The improved process according to claim 39 wherein the milk powder in step (a) is contacted with water in an amount ranging from about 0% to about 10% by weight of the milk powder.

41. The improved process according to claim 39 wherein step (b) the milk powder is subjected to a temperature ranging from about 100° F. to about 225° F. and a shear rate of about 420 $s^{-1}$ to about 3000 $s^{-1}$.

42. The improved process according to claim 39 where the anti-oxidant is tocopherol.

43. The improved process according to claim 39 wherein the amount of anti-oxidant ranges from about 0.01% to about 0.15% by weight.

44. The process according to claim 34 wherein the emulsifier is present.

* * * * *